US006678021B2

(12) United States Patent
Ohkawa

(10) Patent No.: US 6,678,021 B2
(45) Date of Patent: Jan. 13, 2004

(54) LIGHT GUIDE PLATE, SURFACE LIGHT SOURCE DEVICE AND LIQUID CRYSTAL DISPLAY

(75) Inventor: Shingo Ohkawa, Koshigaya (JP)

(73) Assignee: Enplas Corporation, Saitama (JP)

( * ) Notice: Subject to any disclaimer, the term of this patent is extended or adjusted under 35 U.S.C. 154(b) by 214 days.

(21) Appl. No.: 09/929,363

(22) Filed: Aug. 15, 2001

(65) Prior Publication Data

US 2002/0041349 A1 Apr. 11, 2002

(30) Foreign Application Priority Data

Aug. 17, 2000 (JP) ....................................... 2000-247580

(51) Int. Cl.[7] ............................................ G02F 1/1335

(52) U.S. Cl. ............................ 349/65; 349/62; 349/64; 349/95

(58) Field of Search ............................ 349/62, 64, 65, 349/95

(56) References Cited

U.S. PATENT DOCUMENTS 5,485,157 A * 1/1996 Long .......................... 342/160
5,719,649 A * 2/1998 Shono et al. ................. 349/65
5,890,791 A * 4/1999 Saito ........................... 362/31
5,926,601 A * 7/1999 Tai et al. ..................... 385/146
5,997,148 A * 12/1999 Ohkawa ...................... 362/31
6,379,016 B1 * 4/2002 Boyd et al. ................... 362/31
2002/0003593 A1 * 1/2002 Arakawa et al. .............. 349/65

* cited by examiner

*Primary Examiner*—George Eckert
*Assistant Examiner*—N. Drew Richards

(57) ABSTRACT

A light guide plate, surface light source device and liquid crystal display of a double-reflection-direction-conversion type have a heightened applicability to an front-lighting arrangement. A back face 14 of a light guide plate 10 is provided with micro-reflectors shaped like trapezoids each of which has a bottom face extending generally in parallel with a general plane of the back face 14. A main input light H10 to a micro-reflector 20 is incident to an incidence end face 12 (at point a) and inputted thereto in a somewhat downward inclined direction. An inner input light is inner-reflected mainly by slopes 21 and 22 successively (at points b and c), becoming an inner output light IO directed to an emission face 13. The inner output light IO is emitted from the emission face 13 (at point d), being supplied to an LCD panel or the like after transmitting through a light diffusion sheet DF (points e and f). An application to a front-lighting arrangement prevents the displayed image from being blurred since a returning light coming from an LCD panel is hardly bent by the micro-reflectors.

11 Claims, 15 Drawing Sheets

(a)

(b)

(c)

(a)

(b)

LIGHT GUIDE PLATE, SURFACE LIGHT SOURCE DEVICE AND LIQUID CRYSTAL DISPLAY

BACKGROUND

1. Field of Invention

The present invention relates to a light guide plate which is supplied with light sideways and deflects the light to output from an emission face, further relating to a surface light source device employing the light guide plate, still further relating to a liquid crystal display employing the surface light source device for lighting of LCD panel, in particular, front-lighting of it.

2. Related Art

A surface light source device of a type comprises a light guide plate having an end face, through which light is introduced, and two major faces (i.e. faces larger than end faces) one of which provides an emission face, being employed for various uses such as back-lighting or front-lighting for a liquid crystal display. Basic performance of surface light source devices of such a type greatly depends on light guide plates employed therein.

A basic function of a light guide plate is to change a propagation direction (roughly in parallel with an emission face of the light guide plate) of light introduced into the light guide plate through a side end face so that the light is emitted from the emission face. As known well, a simply transparent light guide plate to which no modification is applied is capable of deflecting light slightly, providing an unsatisfactory brightness. Therefor any means for promoting emission from the emission face is required.

Means for promoting emission from a light guide plate relies upon one of the followings or some of them as combined.

(1) Scattering power within a light guide plate (light scattering guide plate);

(2) Emission face (a major face) provided with light diffusibility;

(3) Back face provided with light diffusibility;

(4) Emission face provided with light-refractive unevenness;

(5) Back face provided with light-refractive unevenness.

Ways based on (1) provide uniform and highly effective emission with ease. However, the emission is subject to have a preferential direction much inclined with respect to a frontal direction. (Usually, the inclination is about 60 to 75 degrees to a normal with respect to the emission face.) Therefore, a member (prism sheet) for modifying the inclined direction to the frontal direction must be arranged. Although employment of a light diffusion sheet brings some increase in frontal emission, it involves a wide light diffusion which leads to reduction in light energy efficiency.

Ways based on (2) or (3) hardly provide uniform and effective emission. The emission is also preferentially directed to oblique directions as in the case of (1). An increased light diffusibility checks the efficiency because of factors such as wide range scattering or absorption by light scattering elements (e.g. white ink).

Ways based on (4) are capable of causing light to escape from the emission face with ease while positive direction conversions are less effected. Accordingly, it is hardly expected to realize a highly efficient emission. In particular, it is not advantageous that they fail to generate light which travels from the back face to the emission face.

Ways based on (5) positively generate light which travels from a back face to an emission face of a light guide plate, being free from wide range light scattering. Accordingly, the ways are latently capable of efficiently generating an emission directed to approximately frontal directions. A further merit is that a good applicability to a front-lighting-type LCD, which has been used often recently, is realized.

However, in practice, prior arts fail to control propagating direction of emission sufficiently.

FIG. 1*a* to FIG. 1*c* illustrate examples to which the above (5) is applied. Referring to the illustrations, reference number 1 indicates a light guide plate made of a transparent material such as acrylic resin, which has a side end face to provide an incidence end face 2. A primary light source L is disposed beside the incidence end face 2 to be supplied with light from the primary light source L. One of two major faces 3, 4 of the light guide plate 1 provides an emission face 3. The other major face (called "back face") is provided with a great number of recesses 5 with slopes 5*a*, 5*b* in profile.

The primary light source L emits light, which is introduced into the light guide plate 1 through the incidence end face 2. Upon encountering a recess, the propagation light within the light guide plate 1 (as represented by G1, G2) is inner-reflected by one slopes 5*a* to be directed to the emission face 3. Inner-incidence angle is denoted by θ and an emission derived from beams G1, G2 is denoted by G1', G2'. In other words, the slope 5*a*, which is relatively near to the incidence end face 2 (or primary light source L) compared with the other slope 5*b*, provides an inner-reflection slope for direction conversion. This effect is sometimes called edge-lighting effect.

The recesses 5 are formed like dots or linear channels. As shown in FIGS. 1*a* to 1*c*, formation pitch d, depth h or slope inclination ϕ of the recesses 5 is varied depending on distance from the incidence end face 2. Such variations prevent brightness on the emission face 3 from varying depending on distance from the incidence end face 2.

However, prior arts as shown in FIGS. 1*a* to 1*c* are subject to the following problems.

1. There is a region which is located behind the slope 5*b* as viewed from the incidence end face 2 and is hardly supplied with light. Therefore, a reduced formation pitch d gives no increasing in direction conversion efficiency, with the result that the emission face 3 is apt to show an unevenness in brightness.
2. Direction control regarding in a plane parallel to the incidence end face is not sufficiently effected. For example, if travelling directions of G1, G2 shown in FIG. 1*a* are parallel to the emission face 3 but not perpendicular to the incidence end face 2, emitted light G1', G2' will diverge to the right and left as viewed from the incidence end face 2. There is a remarkable amount of light component which is not perpendicular to the incidence end face 2 in an actual light guide plate. Therefore, it is difficult to obtain an emission which is directed to a desirable spatial direction (regarding in both planes perpendicular and parallel to the incidence end face).
3. Leaking of light from the back face 4 occurs easily because direction conversion to produce light directed to the emission face 3 relies on a single reflection (slope 5*a*). In other words, a condition of total reflection is broken easily at the reflection for direction conversion. For example, if beams G1', G2' are to be directed toward a generally frontal direction, inner incidence angle is about 45 degrees. This value is roughly equal to the critical angle of an interface between acrylic resin, which is a typical material of a light guide plate, and air. Therefore, a remarkable part of light directed somewhat downward leaks through the slope 5*a*.

The present inventor proposed a light guide plate having a back face provided with a great number of micro-reflectors shapes like projections as shown in FIG. 2*b,* and surface light source device/LCD employing the light guide plate, which were disclosed (PCT/JP00/00871;WO00/49432). FIG. 2*a* is a partially enlarged perspective view around a micro-reflector to illustrate light paths of an inner input light. Note that size of micro-reflector is exaggerated for the sake of explanation.

As shown in FIG. 2*a,* a light guide plate 100 has a back face 114 provided with micro-reflectors 120 projecting from a general plane of the back face. The illustrated micro-reflector 20 has a shape like a block having six faces 121, 122, 123, 124, 127 and 128.

The faces 121 and 122 provide a guiding portion to effect a smooth light input for direction-conversion. The faces 121 and 122 meet each other at a ridge portion 126. On the other hand, the faces 123 and 124 effect reflections twice for direction-conversion, producing an inner output light. The faces 123 and 124 meet each other at a ridge 125.

The faces 27 and 28 are side walls limiting width of the micro-reflector. Orientation of each micro-reflector is represented by an extending direction of the ridge 125.

An orientation of the micro-reflector 120 is aligned to a main light input direction (coming direction), thereby making an approximately maximized light input to the micro-reflector and accordingly effecting an approximately maximized light direction conversion.

In FIG. 2*a,* an input light is represented by beams H1, H2 which is directed to a direction approximately perpendicular to the incidence face 12. However, light that is actually inputted into the micro-reflector 120 is not precisely parallel to the general plane of the back face 114 but progresses somewhat downward. Light that progresses precisely parallel to the general plane of the back face 114 or approaches the emission face 113 advances deep without being inputted to micro-reflectors 120. That is, the micro-reflectors 20 do not obstruct light advancing and make no region little light reaches, thereby effecting contrary to the recesses (See FIG. 1).

Viewing from the standpoint of the beams H1 and H2, the reflection faces 123 and 124 form a valley. The ridge 25 corresponds to a bottom of the valley. The valley gets narrower and shallower gradually. Therefore, beams H1 and H2 entering the valley are inner-reflected by one of the slopes 123 and 124, and then inner-reflected again by the other slope 124 or 123 almost without fail.

As a result, a light propagation direction is converted twice to produce inner output light J1, J2 directed to the emission face 113. Direction of the inner output light J1, J2 can be controlled within a remarkable range through adjusting directions (spatial directions) of slopes 123 and 124. If the directions of the slopes 123 and 124 of all micro-reflectors are adjusted so that every inner output light J1, J2, which is made from the input light H1, H2 in accordance with a main light coming direction, has a direction that generally accords with a normal with respect to the emission face 113, almost the whole of the emission face 113 provides an output light like a parallel flux directed to a generally frontal direction.

However, the above-improved light guide plate or surface light source device employing it remains a problem unsolved and required to be overcome. This problem is that they bring display contrast and resolving characteristics which are somewhat unsatisfactory if applied to a liquid crystal display of front-lighting type. This situation is illustrated in FIG. 3.

As known well, light is supplied to an LCD panel through an emission face of a surface light source device in an front-lighting arrangement, returning to the light guide plate with an intensity distribution according to the information to be displayed. Such returning light is emitted through a back face of the light guide plate while some of the returning light is incident to a micro-reflector from its just facade direction. This is shown by references R1, R2 in FIG. 3.

Returning light R1, R2 to a micro-reflector 120 is inner-incident to the micro-reflector 120 at positions which are almost always located on any slope (for example, on the slopes 121 and 122 as shown in FIG. 3). As a result, the returning light R1, R2 is subject to bent-emission involving deflection as shown by references S1, S2. Needless to say, such a bent-emitted light gives a reduced display contrast and leads to a reduction in sharpness of information to be displayed (i.e. blurring of an image to be displayed).

OBJECT AND SUMMARY OF INVENTION

The present invention aims to overcome the above-mentioned problem s of prior arts. That is, an object of the present invention is to improve an light guide plate used for emitting light, which is introduced from a side end face (incidence end face), from an emission face so as to have no region which light is hard to reach and to have an emission direction easily controllable and further to have a heightened applicability to a front-lighting arrangement.

Another object of the present invention is provide a surface light source device which is capable of efficiently providing an illumination light that has a direction regarding well-controlled in both planes perpendicular and parallel to an incidence end face by means of said improved light guide plate without a particular need of direction modifying member such as prism sheet.

Still another object of the present invention is provide a liquid crystal display that allows an easy observation from a desired direction by applying said surface light source device to a backlight or front-lighting arrangement for the liquid crystal display. The present invention also aims prevent the front-lighting arrangement from bringing reduced contrast and sharpness of an image to be displayed.

The present invention resolves the problems based on an idea that direction conversion is effected by a great number of micro-reflectors like tablelands for effecting double inner-reflection which are formed on a back face of a light guide plate, wherein each of the micro-reflector has a pair of slopes adjacent to the tableland top face.

In the first place, the present invention improves a light guide plate that comprises two major faces to provide an emission face and a back face and a side end face for introducing light. The back face of the light guide plate in accordance with the present invention is provided with a great number of micro-reflectors for light-direction-conversion. Each of the micro-reflectors is a projection shaped like a tableland projecting from a general plane on which the back face generally extends, each of the micro-reflectors providing inside a flat bottom face and a valley adjacent to the bottom face.

The bottom face extends approximately in parallel with the general plane on which the back face generally extends and, the valley including first and second slopes and is formed as to tend to get narrower and shallower with an increasing distance from the bottom face.

This causes an inner input light reaching the valley to be inner-reflected by one of the first and second slopes and then inner-reflected by the other, causing an inner output light directed to the emission face to be produced. An extending directions of the valley may vary depending on position on the back face.

In the next place, the present invention improves a surface light source device that comprises at least one primary light source and a light guide plate having two major faces to provide an emission face and a back face and a side end face for introducing light from the primary light source.

In a surface light source device in accordance with the present invention, the back face of the light guide plate is provided with a great number of micro-reflectors for light-direction-conversion. Each of the micro-reflectors is a projection shaped like a tableland projecting from a general plane on which the back face generally extends, each of the micro-reflectors providing inside a flat bottom face and a valley adjacent to the bottom face.

The bottom face extends approximately in parallel with the general plane on which the back face generally extends and, the valley including first and second slopes and is formed as to tend to get narrower and shallower with an increasing distance from the bottom face.

This causes an inner input light reaching the valley to be inner-reflected by one of the first and second slopes and then inner-reflected by the other, causing an inner output light directed to the emission face to be produced. An extending directions of the valley may vary depending on position on the back face.

Light introduction may be done from a plurality of directions different from one another. In this case, said great number of micro-reflectors are preferably classified regarding orientation into groups corresponding to said plurality of directions respectively so that micro-reflectors belonging to each of said groups has charge of a partial production of said inner output light according to a share allotted to each of said groups.

Such an improved surface light source device may be applied to a lighting arrangement of a liquid crystal display. In particular, if the surface light source device is applied to a front-lighting arrangement of a liquid crystal display of front-lighting type, the surface light source device brings a merit that neither display contrast nor sharpness is spoiled because a reduced bent-emission is produced by the returning light from the LCD panel (See FIG. 3 and related description).

EMBODIMENTS (1) First Embodiment

Figure 4A:
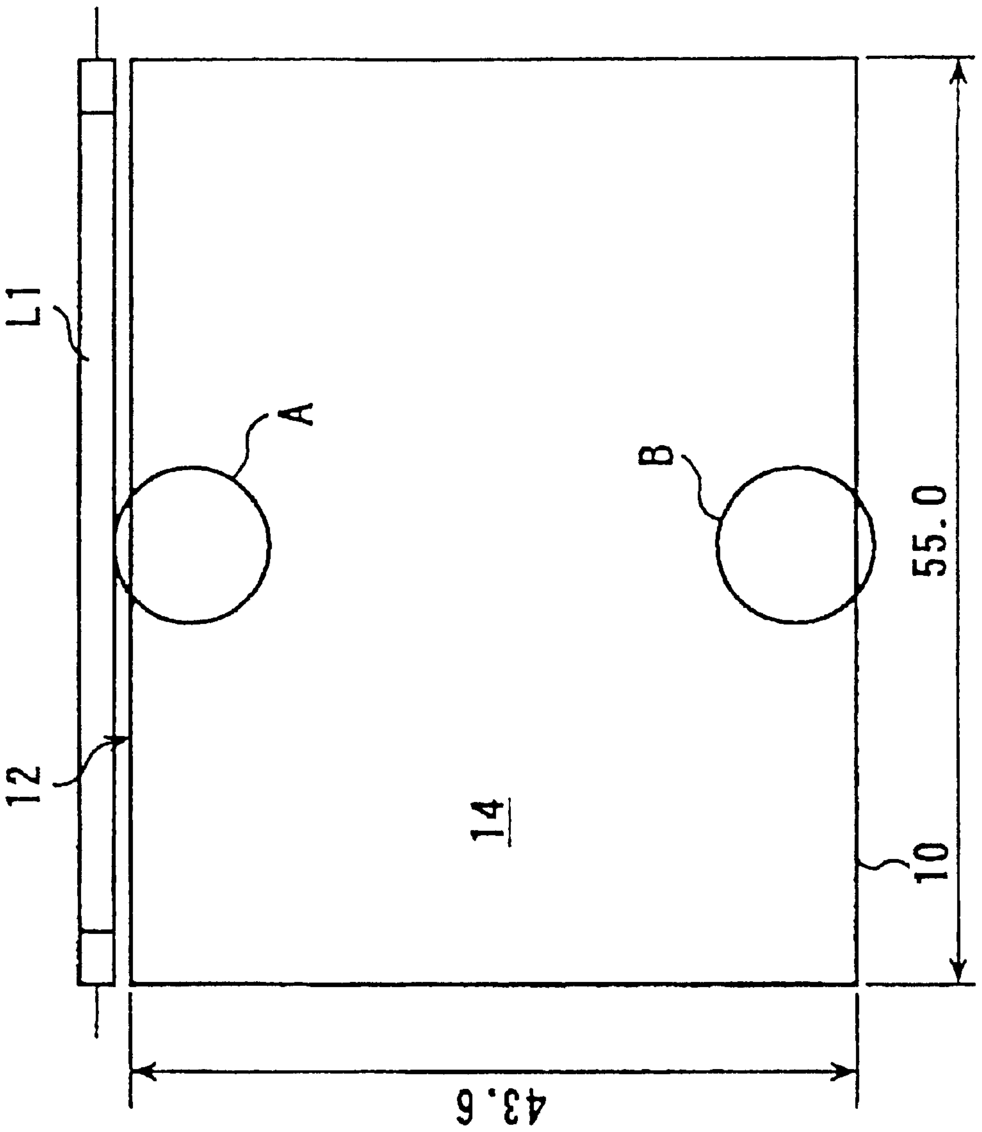
FIGS. 4*a* and 4*b* illustrate an outlined arrangement of a first embodiment in accordance with the present invention, FIG. 4*a* being a plan view from the back face side of a light guide plate, FIG. 4*b* being a side view from the left side in FIG. 4*a;*
Figure 4B:
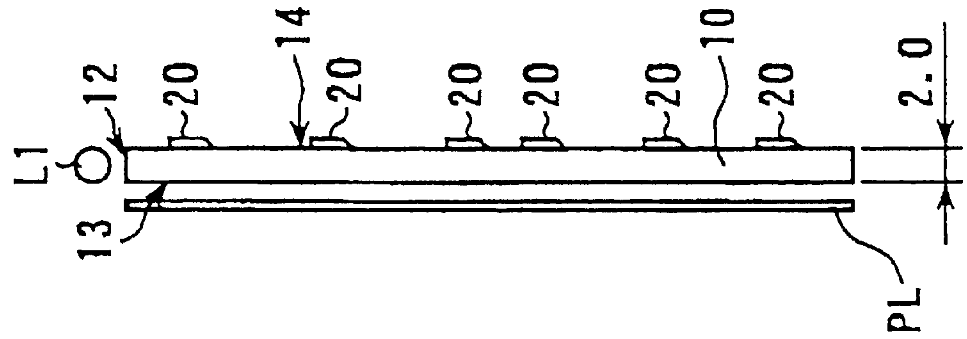

FIGS. 4*a* and 4*b* illustrate an outline of the first embodiment in accordance with the present invention. FIG. 4*a* is a plan view from the back face side of a light guide plate and FIG. 4*b* is a side view from the left side in FIG. 4*a.*

Referring to FIGS. 4*a* and 4*b,* a light guide plate 10 made of a transparent material such as acrylic resin, polycarbonate (PC) or cycloolefin-type resin has a minor face (side end face) to provide an incidence end face 12. A rod-like primary light source (cold cathode tube) L1 is disposed along the incidence end face 12 which is supplied with light from the light source. One of major faces 13, 14 of the light guide plate 10 provides an emission face 13. The other major face (back face) 14 is provided with a great number of micro-reflectors 20.

A well-known liquid crystal display panel PL is disposed on the outside of the emission face 13, providing a backlight-type liquid crystal display. Note that indicated dimension values in mm are merely examples.

The primary light source L1 emits light, which is introduced into the light guide plate 10 through the incidence end face 12. When light enters into a micro-reflector 20 on the way of propagation within the plate 10, the micro-reflector 20 effects mainly double reflection as described later therein to generate a light which is directed to the emission face 13.

In other words, "an input light to micro-reflectors 20 is converted into an inner output light directed to the emission face 13", because the micro-reflectors 20 provide direction conversion means for converting a propagation direction of an inner propagation light. Configuration and operation of individual micro-reflector 20 are described in details later.

Figure 5A:
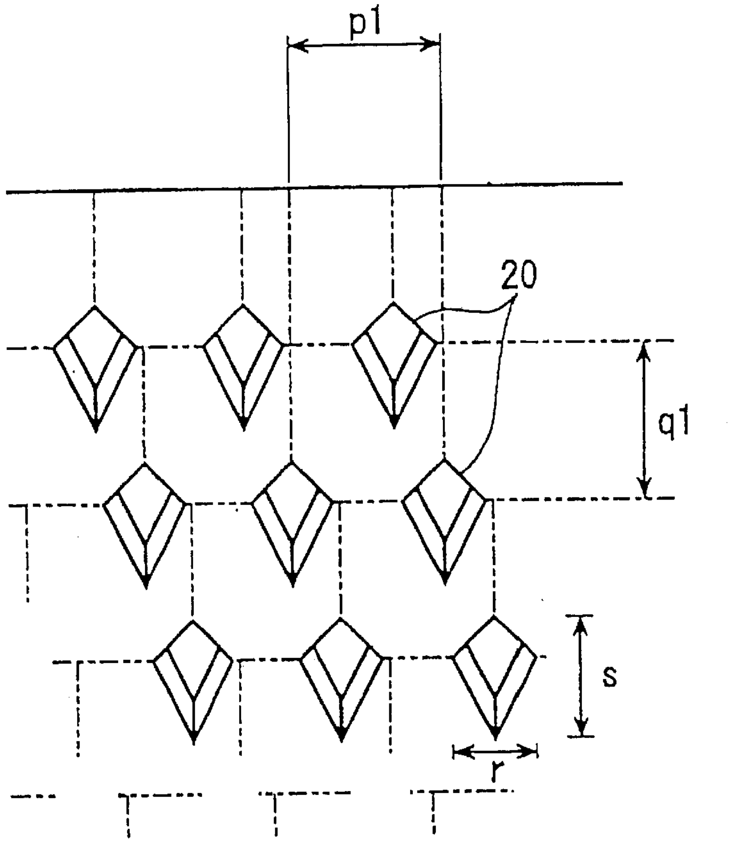
FIGS. 5*a* and 5*b* illustrate an arrangement of micro-reflectors 20 in the first embodiment, FIG. 5*a* being an enlarged illustration of a circled part A in FIG. 4*a,* and FIG. 5*b* being an illustration of micro-reflector arrangement in a circled part B in FIG. 4*a;*
Figure 5B:
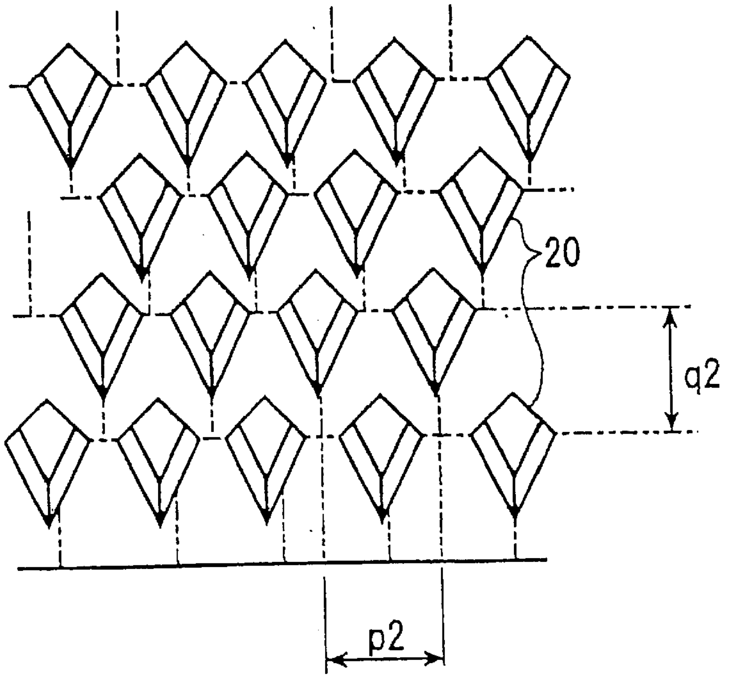

FIGS. 5*a* and 5*b* illustrate an arrangement of the micro-reflector 20 in this embodiment, FIG. 5*a* being an enlarged illustration of a circled part A in FIG. 4*a,* and FIG. 5*b* being an illustration of micro-reflector arrangement in a circled part B in FIG. 4*a*. As shown in the illustrations, formation pitches along traversing and depth directions p and q are set so that p1=q1=220 μm around circle A and p2=q2=130 μm.

Although the shown values of p and q are merely examples, micro-reflectors 20 are distributed with a relatively small density in area A relatively near to the incidence end face 12 while they are distributed with a relatively large density in area B relatively far from the incidence end face 12. Formation pitch tends to get smaller gradually according to increasing distance from the incidence end face 12, although not shown, over the back face 14.

In other words, formation density (covering rate) gets larger gradually according to increasing distance from the incidence end face 12.

Concrete values are determined in designing, being such as about 10% in area A near to the incidence end face 12 and about 30% in area B far from the incidence end face 12. Such low-and-high-adjusted covering rates uniformalize brightness over the emission face 13.

Note that covering rate is defined as follows.

$$\text{Covering rate}=S/(p\times q);$$

where S is cross section of a micro-reflector cut along a general plane of the back face 14 and p, q are formation pitches along traversing and vertical directions, respectively.

Note that "general plane of the back face 14" is a plane on which the back face 14 extends provided that the micro-reflectors are taken away.

Each micro-reflector 20 provides a projection shaped like a tableland having a cross section like a rhombus. Size of profile (rhombus) is designed so that individual micro-reflector is hardly visible. Seeing that size of an individual micro-reflector corresponds to the lower limit of formation pitch, it is preferable that each micro-reflector has a small size. A large formation pitch tends to bring a visible bright-dark pattern. Shown values in FIG. 5, r=abut 80 μm; s=abut 120 μm, are examples.

It should be noted that micro-reflectors 20 avoid from being aligned along a light coming direction (approximately vertical to the incidence end face 12 in this case) in order to give chances of direction conversion evenly. That is, it is preferable that the arrangement of micro-reflectors 20 does not correspond to any precise two-dimension matrix. Such a manner of arranging is also advantageous to make the micro-reflector arrangement inconspicuous as possible.

Figure 6:
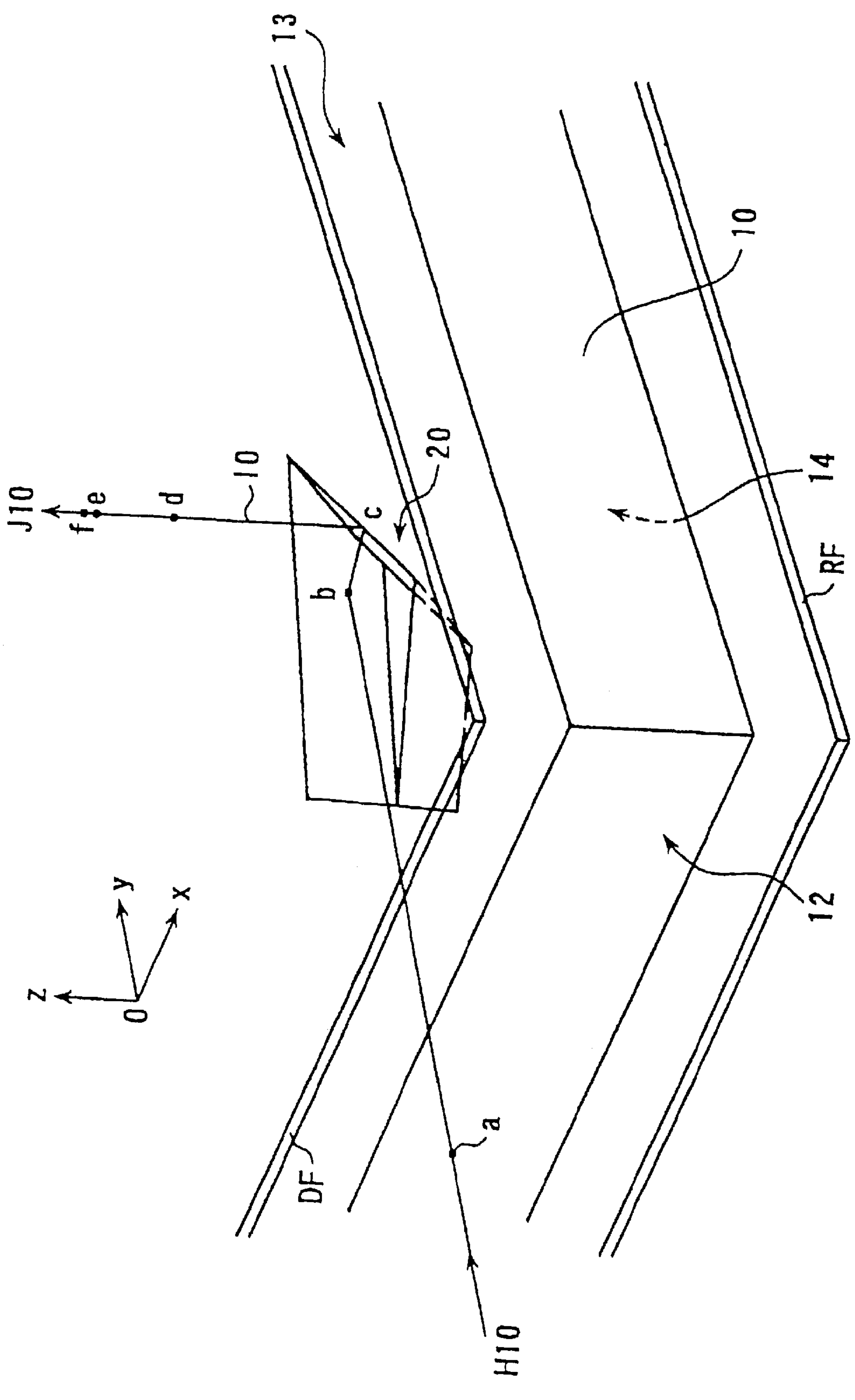
FIG. 6 is an enlarged perspective view illustrating a representative path (main route) of an input light to the light guide plate, the path showing a travelling until the light is emitted from an emission face after being direction-converted by a micro-reflector.
Figure 7A:
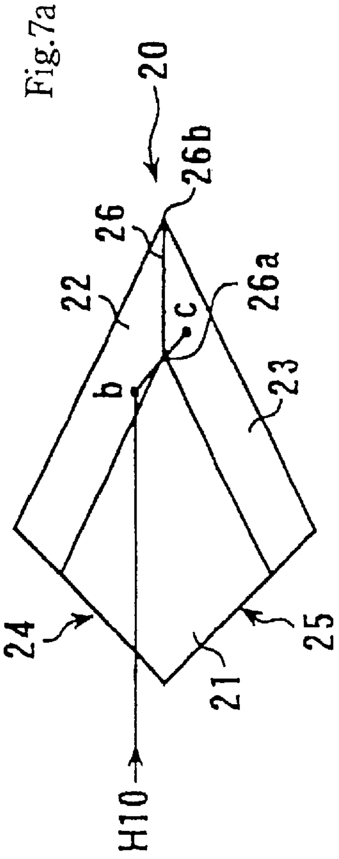
FIGS. 7*a* through 7*c* illustrating a direction conversion effect of a micro-reflector 20 in an arrangement shown in FIG. 6 from three view from +x direction and FIG. 7*c* being a view from +y direction.
Figure 7B:
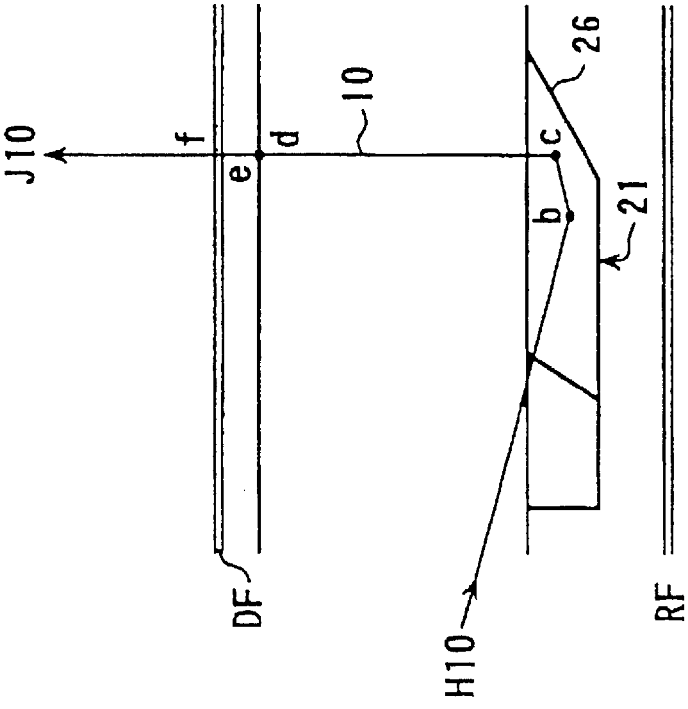
Figure 7C:
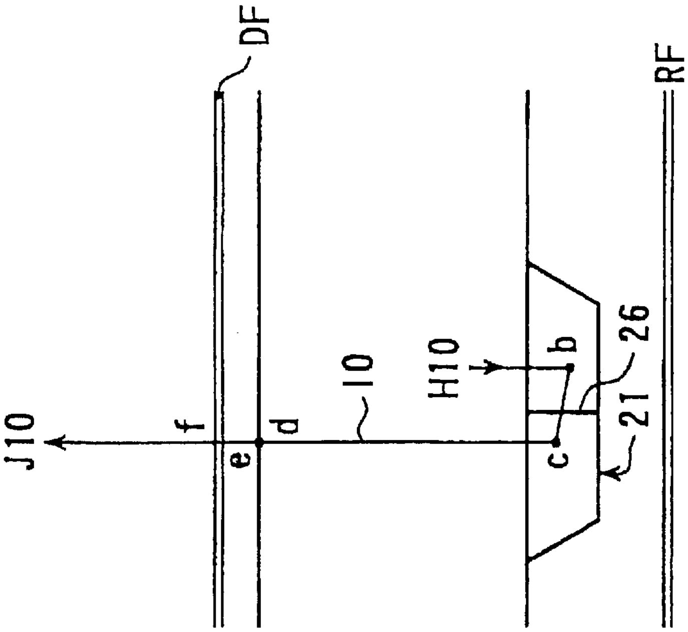
Figure 8:
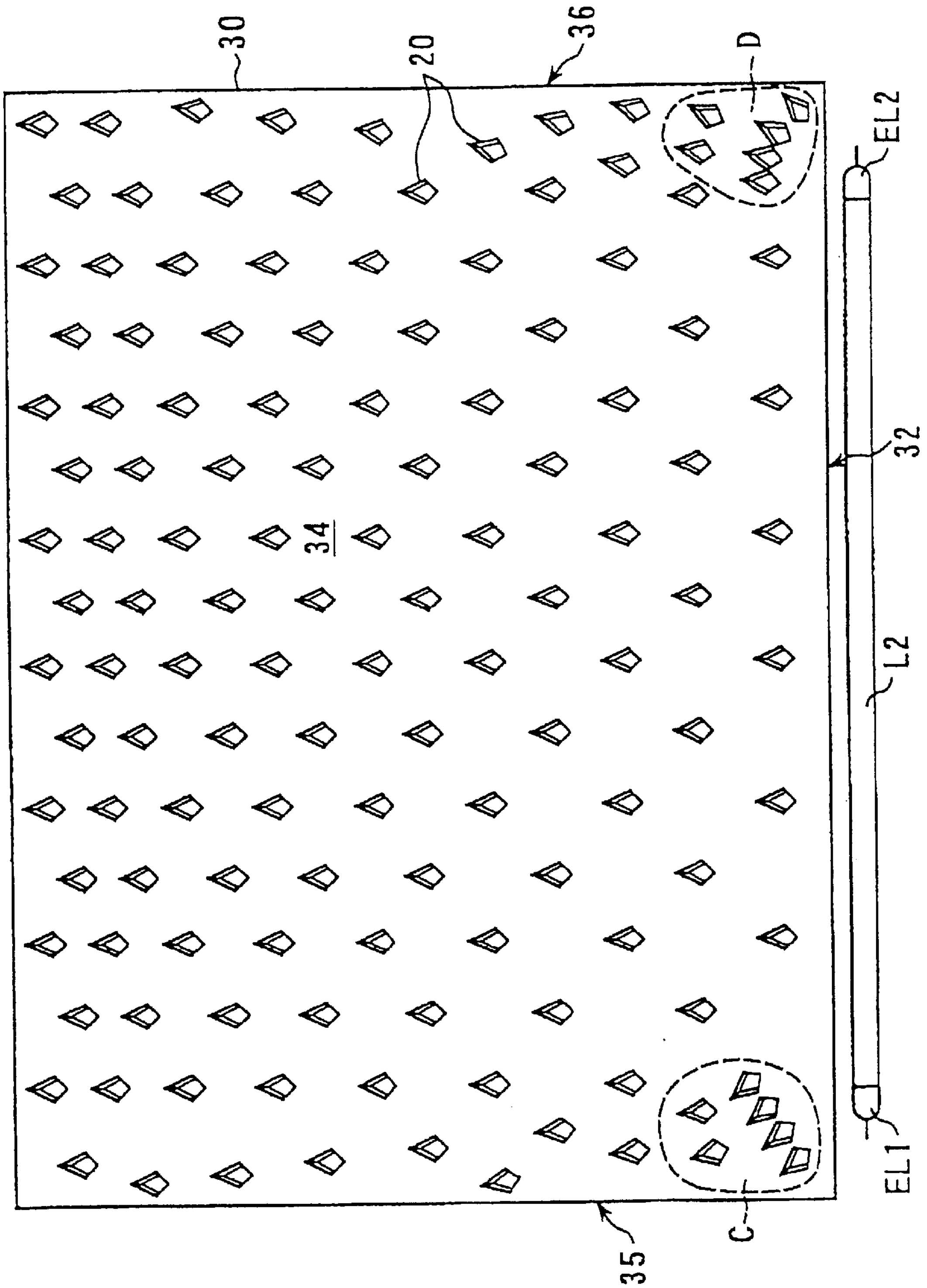
FIG. 8 is a plan view illustrates an arrangement of micro-reflectors in a second embodiment.

Next, a direction conversion function of the micro-reflector is described with referring to FIGS. 6 to 8. The following description is also applied to micro-reflectors employed of light guide plates employed in the other embodiments.

FIG. 6 illustrates a representative path from an inputting of light to the light guide plate 10, via a micro-reflector 20, to an emitting from the emission face 13. Size of the micro-reflector 20 is exaggerated for the sake of illustration. A Cartesian coordinates O-xyz is set so that zx-plane extends generally in parallel with the incidence end face 12 and xy-plane extends generally in parallel with the emission face 13.

Further to this, a light diffusion sheet DF is disposed additionally along the emission face 13 and a reflection sheet RF having a regular or irregular reflectivity is disposed additionally along the back face 14. An LCD panel PL is not shown.

FIGS. 7*a* through 7*c* illustrating a direction conversion effect of a micro-reflector 20 in the arrangement shown in FIG. 6 from three directions (from +z direction, from +x direction and then from +y direction).

Referring to these illustrations, the micro-reflector 20 is configured so that it projects from a general plane of the back face 14 of the light guide plate 10. The micro-reflector 20 has a configuration like a tableland having five faces 21 through 25. Direction conversion of an input light is mainly effected by the faces 22 and 23.

Accordingly, the faces 22 and 23 are inclined with respect to all of xy-plane, yz-plane and yz-plane respectively, providing a valley within the micro-reflector 20. A bottom of the valley (looking like a ridge from the outside) 26 extends from a position referenced by numeral 26*a* to another position referenced by numeral 26*b*, corresponding to an intersection where the slopes 22 and 23 meet each other.

According to a feature of the present invention, a flat face 21 is formed as to be adjacent to the valley including the slopes 22 and 23. The face 21 provides a "bottom face" adjacent to the valley, before the slopes 22 and 23 (on the input side), as to widely accept light to be inputted to the faces and 23 and to promote direction conversion of the light. Further, the bottom face 21 extends generally in parallel with the general plane on which the back face 14 generally extends in order to realize a heightened applicability to a front-lighting arrangement as described later.

Accordingly, "height" of a tableland-like micro-reflector 20 is provided by distance between the foresaid general plane and a bottom face 21. Height os each micro-reflector 20 falls within a range, for example, 10 μm to 30 μm.

Provided that S20 is defined as projective area onto the general plane made by the whole body of a micro-reflector and S21 is defined as that made by the bottom face 21, ratio S21/S20 can be adjusted freely. A large ratio of S21/S20 not only ensures a wide route for incidence to the slopes 22 and 23 but also brings a heightened applicability to a front-lighting arrangement (See Sixth Embodiment).

Viewing from this standpoint, ratio S21/S20 is preferably not smaller than 0.3. Particularly saying, an example of practical range is from 0.4 to 0.6. It should be noted, however, that ratio values of S21/S20 excessively near to 1,0 make the whole size too large and likely to be visible, and further make heightening of distribution density (number density) difficult.

It should be also noted that the bottom of the valley 26 gets closer to the general plane of the back face 14 as extending from a starting position 26*a* to a terminal position 26*b*. In other words, the valley including the slopes 22 and 23 gets narrower and shallower gradually with an increasing distance from the bottom face 21.

Faces 24 and 25 adjacent to the bottom face 21 are portions which correspond to "cliffs " of a tableland configuration, preferably falling away sharply like a generally vertical precipice. The reason why tis is preferably adopted is that a reduced light incidence to the faces 24 and 25 is realized when being applied to a front-lighting-type LCD.

An orientation of a micro-reflector 20 can be represented by an extending direction of a valley bottom 26. Here, considering direction, an orientation of a micro-reflector 20 is defined as being represented by a vector directed from a starting position 26*a* on the bottom face 21 side to a terminal position 26*b* as shown in FIG. 7*a*.

An orientated direction (vector 26*a*→26*b*) is preferably aligned to a main light inputting direction (i.e. coming direction). This brings an approximately maximized light input to a micro-reflector 20, accordingly providing an approximately maximized direction conversion efficiency.

In FIGS. 6 and 7*a* to 7*c*, an input light from a main coming direction is represented by beam H10. In this arrangement employing the primary light source L1, the beam H1 is generally perpendicular to the incidence end face 12. However, light that is actually inputted into the micro-reflector 20 is not precisely parallel to the general plane of the back face 14 but progresses somewhat downward (so as to approach the back face 14).

Figure 1:
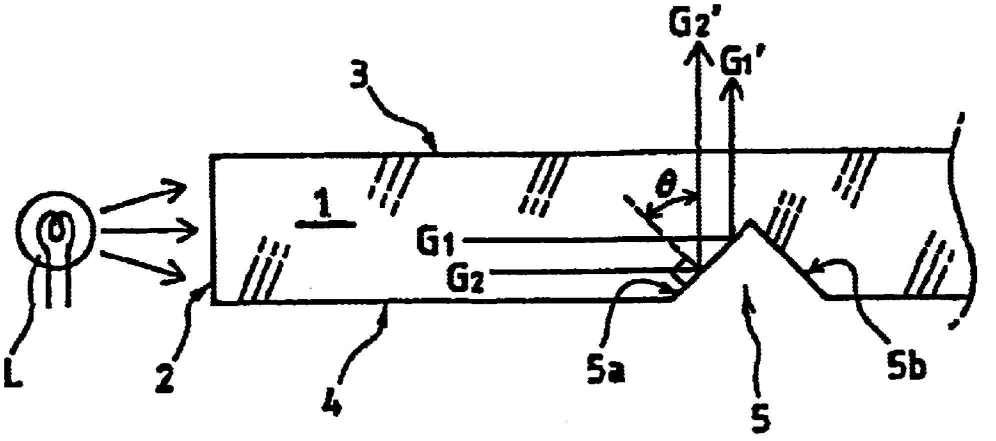
FIGS. 1*a* to 1*c* illustrate prior arts, FIG. 1*a* illustrating principle of edge-lighting, FIGS. 1*b* and 1*c* illustrating arrangements of recesses.
Figure 1:
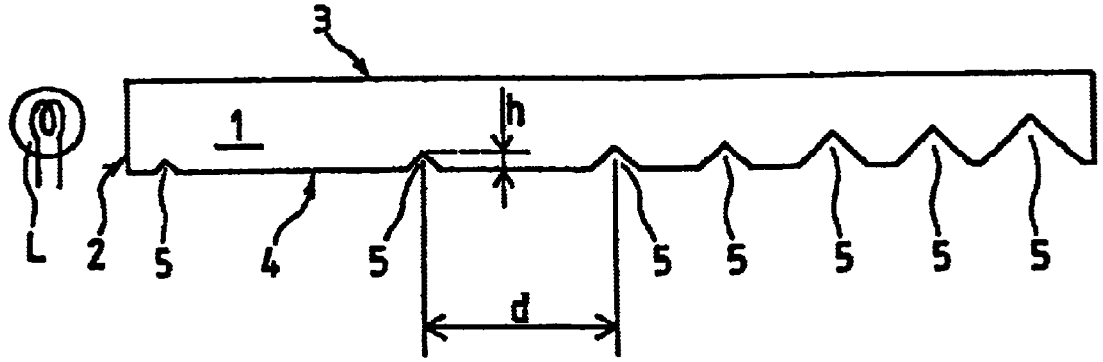
Figure 1:
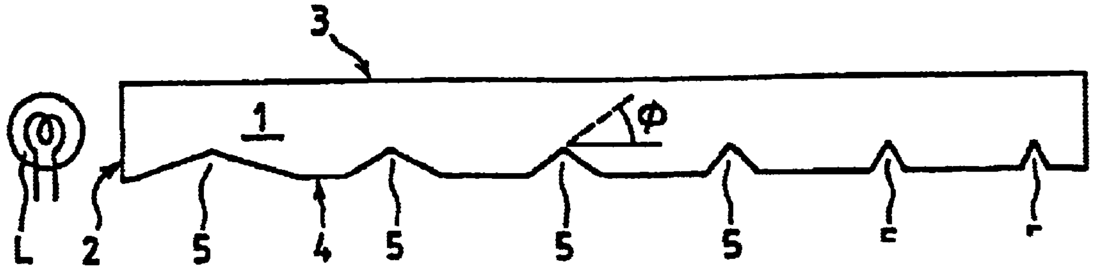
Figure 2:
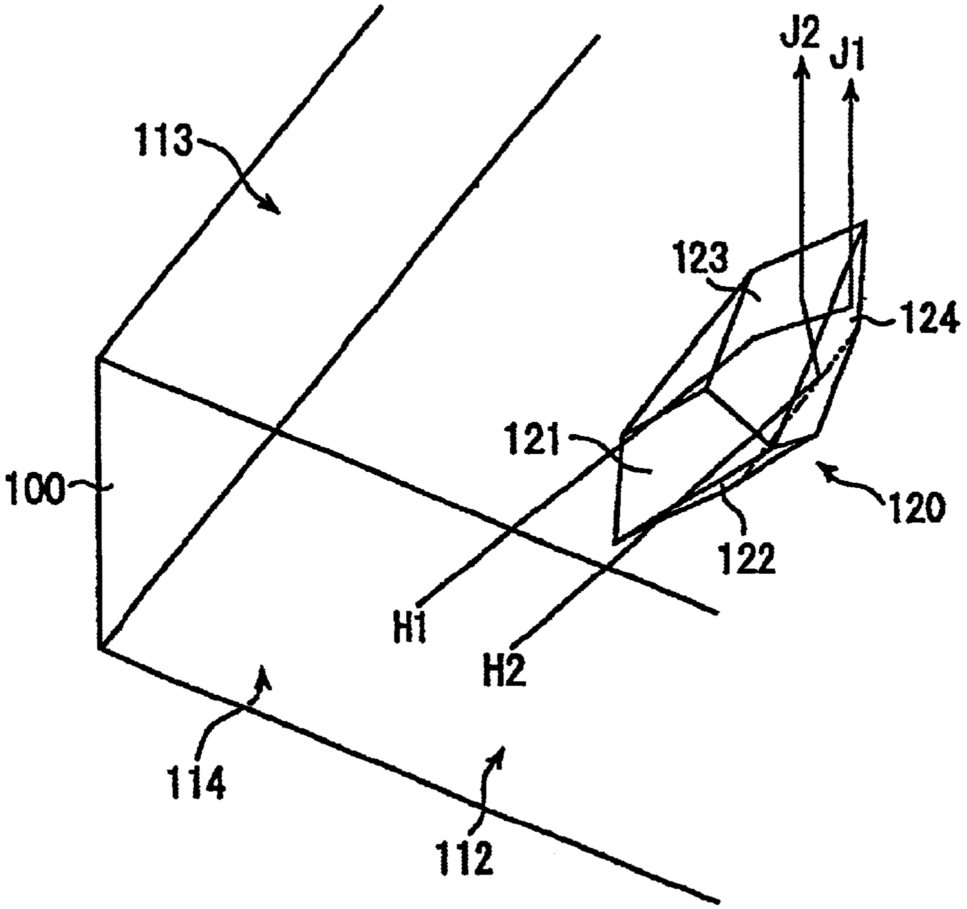
FIGS. 2*a* and 2*b* illustrate a prior art (according to a previous patent application), FIG. 2*a* being a partially enlarged perspective view around a micro-reflector to illustrate light paths of an inner input light, FIG. 2*b* being a perspective view to illustrate a shape of a micro-reflector.
Figure 2:
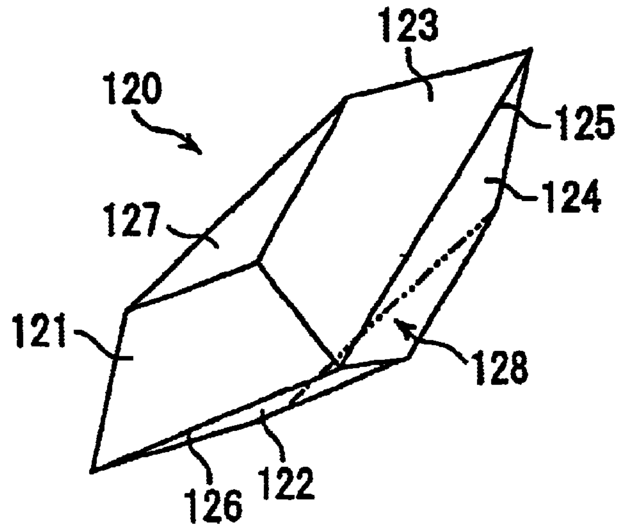

Light that progresses precisely parallel to the general plane of the back face 14 or approaches the emission face 13 advances deep without being inputted to the micro-reflector 20. That is, the micro-reflector 20 does not obstruct light advancing and give no region which is supplied with light little, thereby functioning contrary to cases where recesses are formed (See FIG. 1).

Since the valley including slopes 22 and 23 gets narrower and shallower with an increasing distance from the bottom face 21, the light H10 is inner-reflected, after entering into the valley, first by the slope 22 or 23 and then by the slope 23 or 22. As a result, a direction conversion is effected twice three-dimensionally to produce an inner output light IO directed to the emission face 13.

Direction of the inner output light IO can be controlled within a remarkable range through adjusting directions (spatial directions) of slopes 22 and 23. If the directions of the slopes 22 and 23 of all micro-reflectors are adjusted so that every inner output light IO, which is made from the input light H10 in accordance the light coming direction, has a direction that generally accords with a normal with respect to the emission face 113, almost the whole of the emission face 13 provides an output light J10 like a parallel flux directed to a generally frontal direction.

A convergent output flux converging toward a point distant from the emission face 13 can be obtained through adjusting directions and orientations (extending directions of valley bottoms 26) of the slopes 22 and 23. Directions of the slopes 22 and 23 are not always required to be symmetric with respect to the valley bottom 26. Such asymmetric directions give the output flux an expanded controllability.

Such direction conversion by means of the micro-reflector 20 is effected three-dimensionally, direction is controllable regarding in both zx-plane parallel to the incidence end face 12 and yz-plane perpendicular to the incidence end face 12. Besides, each direction conversion angle required per one reflection is generally small because the direction conversion relies on double reflection. Accordingly, incidence angles to the slopes 22 and 23 are generally sufficiently greater than the critical angle, producing leaking light little.

An outlined route of the beam H10 shown in FIGS. 6 and 7*a* to 7*c* is as follows.

In the first place, the beam H1 is introduced into the light guide plate 10 at an incident point a on the incidence end face 12 and approaches a micro-reflector 20.

Viewing the standpoint of the beam h10, a bottom face 21 of the micro-reflector 20 looks like an entrance widely accepting the incident light before the slopes 22 and 23. After entering into the micro-reflector 20, the beam H10 is incident to one 22 or 23 of the slopes 22 and 23 at a remarkably large incident angle and almost totally-reflected (point b).

An inner output light IO is then produced via another inner-reflection (total reflection) at the other slope 23 (or 22; point c) in a similar manner.

This inner output light IO is emitted from the emission face 13 to become an output light J10 (point d). In the illustrated example, the output light J10 is incident to the diffusion sheet DF (point e), being then emitted from the diffusion sheet DF (point f) to be supplied to the LCD panel PL (See FIG. 4). The diffusion sheet DF is employed and disposed, as required, in order to prevent, through a weak diffusion effect, micro-reflectors 20 bringing a fine-unevenness in brightness which could appear depending on position related to "presence or absence of any micro-reflector".

As aforementioned, the inner output light IO or output light J10 has a travelling direction which can be controlled within a considerable range through adjusting the directions of the slopes 22 and 23. It is noted that the light inputted to the micro-reflector 20 contains a component which is inner-reflected by the bottom face 21.

Much of such light is also converted into an inner output light through double reflection effected by the slopes 22 and 23. This inner output light has a propagation direction somewhat different from that of inner output light IO which does not undergo a reflection at the bottom face 21. As a result, directions of correspondingly produced output light distribute around a direction of the main output light J10 (a generally frontal direction in this case).

There is some light leaking from the back face 14 including the micro-reflectors 20. The reflection member RF has a function of returning the leaking light to the light guide plate 10. Such light, after undergoing a reflection at the reflection member RF, have various escaping positions in the emission face 13 when being emitted from the emission face 13, the positions being expected to have almost no correspondence to the locations of the micro-reflectors 20.

Therefore, it is rather advantageous that the output light includes these light beams other than the main light J10, since a fine-unevenness depending on position corresponding to presence/absence of micro-reflector is thereby avoided.

(2) Second Embodiment

Although the second embodiment has an outline similar to that of the first embodiment as shown in FIGS. 4*a,* 4*b,* the second embodiment employs another light guide plate different from one employed in the first embodiment. In the second embodiment, a light guide plate 30 as shown in FIG. 8 is adopted instead of the light guide plate 10.

The light guide plate 30 is made of a transparent material such as acrylic resin, polycarbonate (PC) or cycloolefin-type resin, which has a side end face to provide an incidence end face 32.

A rod-like primary light source (cold cathode tube) L2 is disposed along the incidence end face 32 which is supplied with light from the light source. It is noted that the cold cathode tube L2 has a light emitting portion length of which is smaller a little than that of the incidence end face 32. Both ends provide electrode portions EL1 and EL2 which are not capable of emitting light. Such a design is often employed in order to avoid the electrode portions EL1, EL2 from protruding.

A great number of micro-reflectors 20 are formed on a back face 34. Each micro-reflector 20 may has a shape and size the same as those of the light guide plate 10. This situation is not changed any one of the third through the sixth Embodiments. Arrangement and orientation of a great number of micro-reflectors 20 involve the following features.

1. Covering rate tends to increase according to distance from the incidence end face 32. This prevents brightness on an emission face from varying depending on distance from the incidence end face 32.
2. Micro-reflectors 20 are arranged in corner areas C, D near to the electrode portions EL1, EL2 at a specially large density. This prevents, together with orientation of the following item 4, prevents dark areas corresponding to the areas C, D from emerging on the emission face.

3. Micro-reflectors 20 are orientated almost over the back face 34 so as to be approximately vertical to the incidence end face 32 and to be aligned to a depth direction. In other words, each micro-reflector 20 is orientated so that its bottom face 21 is located nearer to the incidence end face 32 as compared with the slopes 22 and 23.
4. In the corner areas C, D, micro-reflectors 20 are obliquely orientated with respect to incidence end face 32, with the bottom face 21 being located as to be near to the light emitting portion of the cold cathode tube L2. This causes these micro-reflectors 20 to be orientated corresponding to light coming directions, thereby rising direction conversion efficiency.
5. In both side edge portions 35, 36 except the corner areas C, D, micro-reflectors 20 are orientated so as to be inclined at small angles with respect to the incidence end face 32, with the bottom face 21 being located as to be near to the light emitting portion of the cold cathode tube L2. This causes these micro-reflectors 20 to be orientated corresponding to light coming directions, as the above item 4, thereby rising direction conversion efficiency.
6. Micro-reflector arrangement does not have regularity such that many micro-reflectors 20 align along a straight line. This makes the micro-reflectors 20 more inconspicuous. And besides, if incorporated in a liquid crystal display, the micro-reflectors can avoid from bringing Moire fringes which would be caused by an overlapping relation with a matrix-like electrode arrangement.

(3) Third Embodiment

Figure 9:
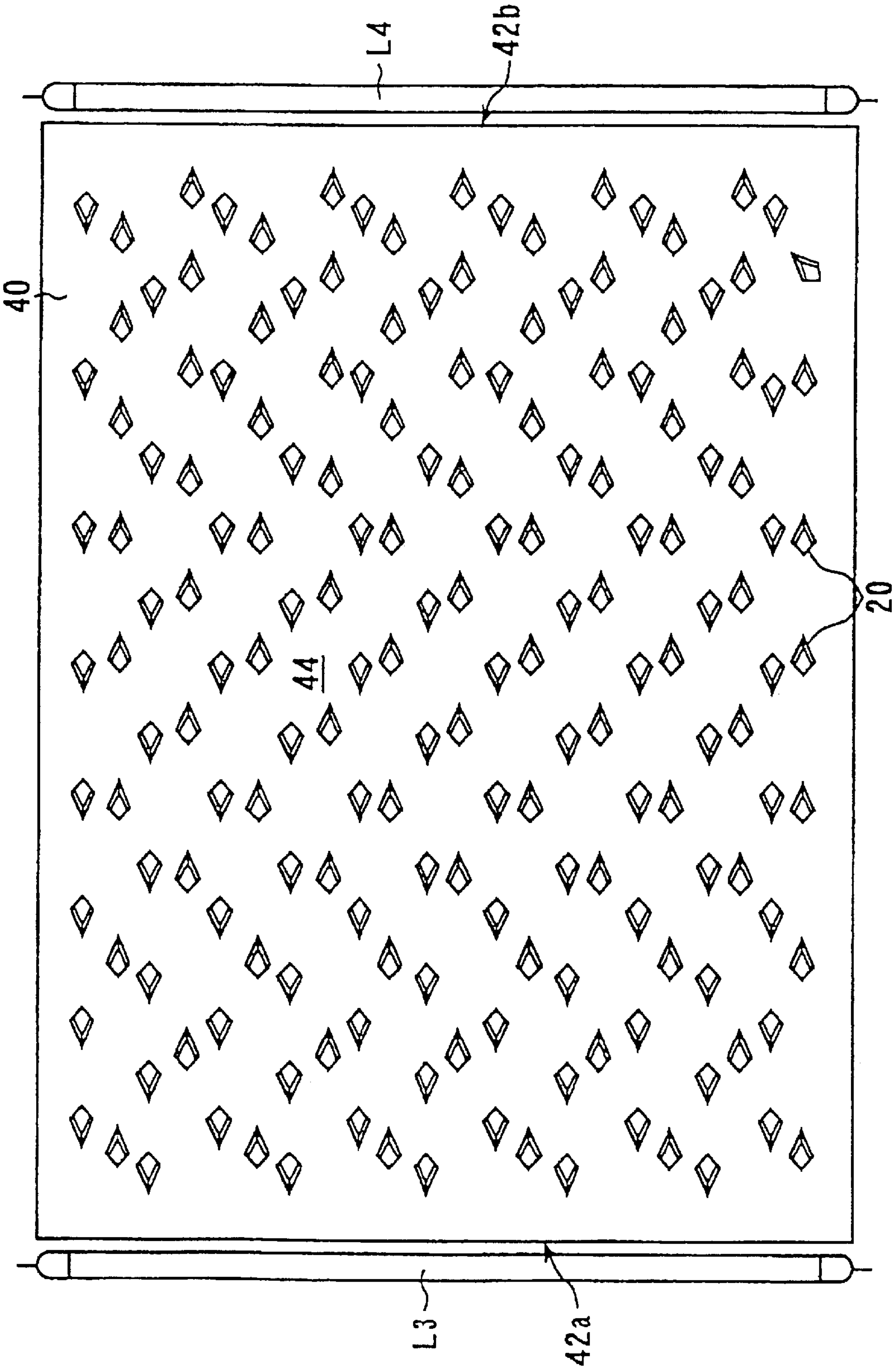
FIG. 9 is a plan view illustrates an arrangement of micro-reflectors in a third embodiment.

Although the third embodiment has an outline similar to that of the first or second embodiment, the third embodiment employs another light guide plate different from ones employed in the first and second embodiments. In the present embodiment, a light guide plate 40 as shown in FIG. 9 is adopted. The light guide plate 40 is made of a transparent material such as acrylic resin, polycarbonate (PC) or cycloolefin-type resin, having two side end faces to provide two incidence end faces 42*a*, 42*b*.

Rod-like primary light sources (cold cathode tube) L3, L4 are disposed along the incidence end faces 42*a*, 42*b* which are supplied with light from the light sources, respectively. A great number of micro-reflectors 20 are formed on a back face 44. Arrangement and orientation of the micro-reflectors 20 involves the following features.

1. Covering rate and orientation of the micro-reflectors 20 are designed as follows.

First, covering rate and orientation distribution (called Distribution 1) are designed so that brightness is uniform over an emission face under a provisional condition that only L3, one of the primary light sources, supplies light.

Next, covering rate and orientation distribution (called Distribution 2) are designed so that brightness is uniform over an emission face under another provisional condition that only the other primary light source L4 supplies light.

Distribution 1 and Distribution 2 are piled up to determine a covering rate and orientation distribution (i.e. Distribution 1+Distribution 2) to be employed in the present embodiment.

Micro-reflectors according to Distribution 1 provide a first group and micro-reflectors according to Distribution 2 provide a second group. Micro-reflectors belonging to one group and the other are not different in shape and size, preferably being roughly equal to each other in number.

Covering rate according to group 1 tends to increase as distance from the incidence end face 42*a* increases while that according to group 2 increases as distance from the incidence end face 42*b* increases.

Consequently, gradient of Distribution 1 tends to cancel that of Distribution 2 as a whole. In the illustrated example, a resultant covering rate is approximately constant.

The micro-reflectors 20 are orientated so as to be aligned roughly vertical to the incidence end face 42. It should be noted that bottom faces 21 of micro-reflectors 20 of group 1 are located as to be directed to the incidence end face 42*a* while slopes 21 of micro-reflectors 20 of group 2 are located as to be directed to the incidence end face 42*b*.

It is to be noted that such grouping technique may be applied to cases where three or more light inputting directions exist. For instance, if light supply is effected from four directions corresponding to four end side faces, four light inputting directions are provided and the micro-reflectors are classified into four groups according which covering rate distribution and orientation distribution are designed.

Total covering rate distribution and total orientation distribution are obtained by piling each covering rate distribution and orientation distribution, respectively, in a manner like that in the above two group case.

2. As in the case of the embodiment 2, micro-reflector arrangement does not have regularity such that many micro-reflectors 20 align along a straight line. This makes the micro-reflectors 20 more inconspicuous. And besides, if incorporated in a liquid crystal display, the micro-reflectors can avoid from bringing Moire fringes which would be caused by an overlapping relation with a matrix-like electrode arrangement.

(4) Forth Embodiment

Figure 10:
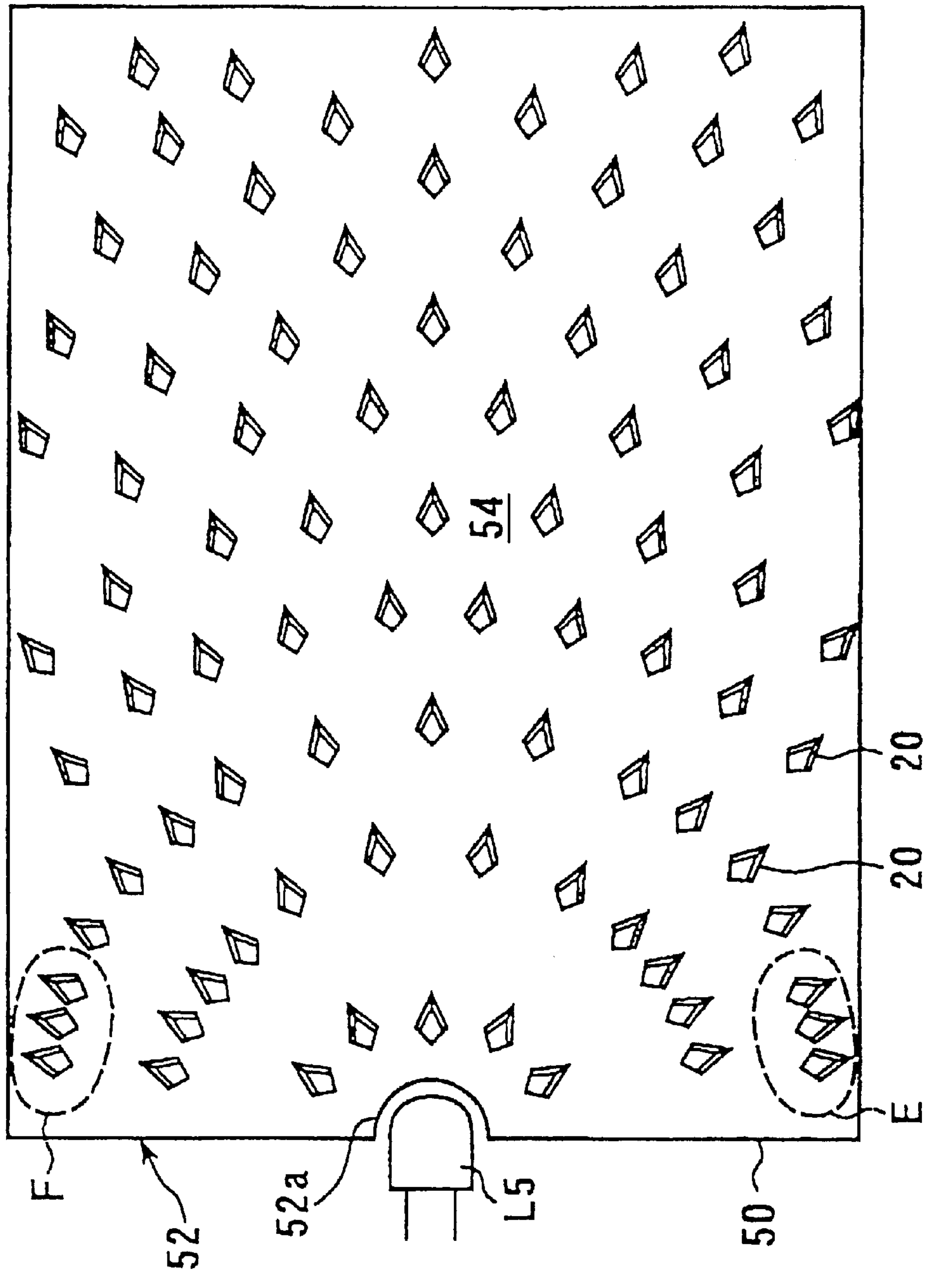
FIG. 10 is a plan view illustrates an arrangement of micro-reflectors in a forth embodiment.

Although the forth embodiment has an outline similar to that of the first, second or third embodiment, the forth embodiment employs a different light guide plate and primary light source. In the present embodiment, a light guide plate 50 and primary light source L5 as shown in FIG. 10 are adopted.

The light guide plate 50 is made of a transparent material such as acrylic resin, polycarbonate (PC) or cycloolefin-type resin, having a side end face 52 with a recess 52*a* to provide an incidence end face at a central portion of the side end face 52.

The primary light source L5 is one or more point-like light sources, for instance, provided with LED (Light Emitting Diode). It should be noted that "point-like light source" is defined as a light source that has an light emitting area smaller by far than the extending area of the incidence face 52. The primary light L5 is disposed so that the light guide plate 50 is supplied with light through the recess 52*a*. A great number of micro-reflectors 20 are formed on a back face 54. Arrangement and orientation of the micro-reflectors 20 involves the following features.

1. Covering rate tends to increase according to distance from the recess 52*a*. This prevents brightness on an emission face from varying depending on distance from the recess 52*a* (or the point-like light source L5).
2. Micro-reflectors 20 are orientated radially with respect to the recess 52*a* over the back face 54. Slope 21 of each micro-reflector is generally directed to the recess 52*a*. Each bottom face 21 of each micro-reflector 20 is located as to be directed to the recess 52*a*.
3. If the point-light source L5 has emitting characteristics with directivity to a frontal direction, covering rate of micro-reflector 20 may be set large around the side end faces 52. In particular, it is preferable to set a great covering rate in corner areas E and F.

4. Micro-reflector arrangement does not have regularity such that many micro-reflectors 20 align along a straight line. This makes the micro-reflectors 20 more inconspicuous. And besides, if incorporated in a liquid crystal display, the micro-reflectors can avoid from bringing Moire fringes which would be caused by an overlapping relation with a matrix-like electrode arrangement.

(5) Fifth Embodiment

Figure 11:
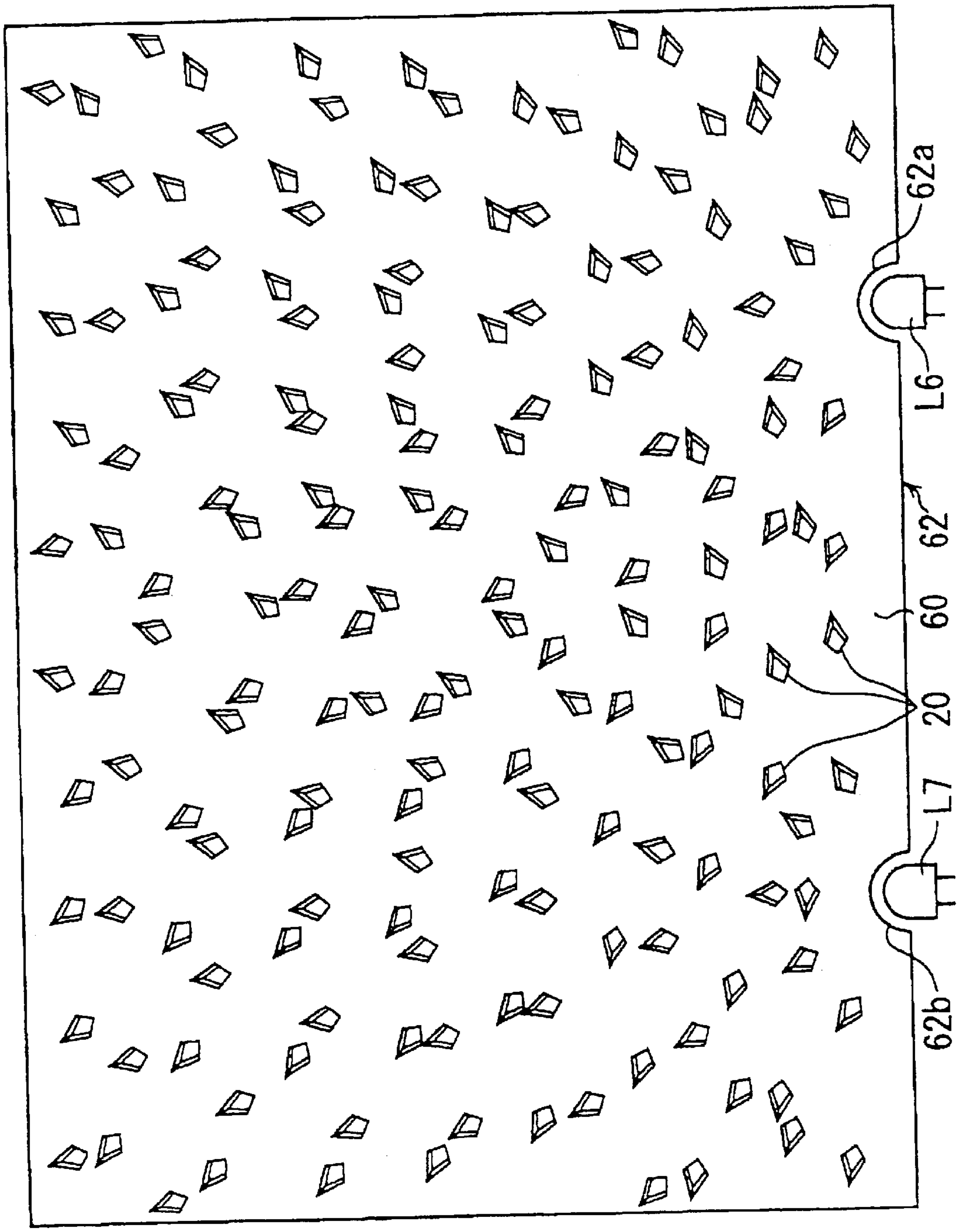
FIG. 11 is a plan view illustrates an arrangement of micro-reflectors in a fifth embodiment.
Figure 12:
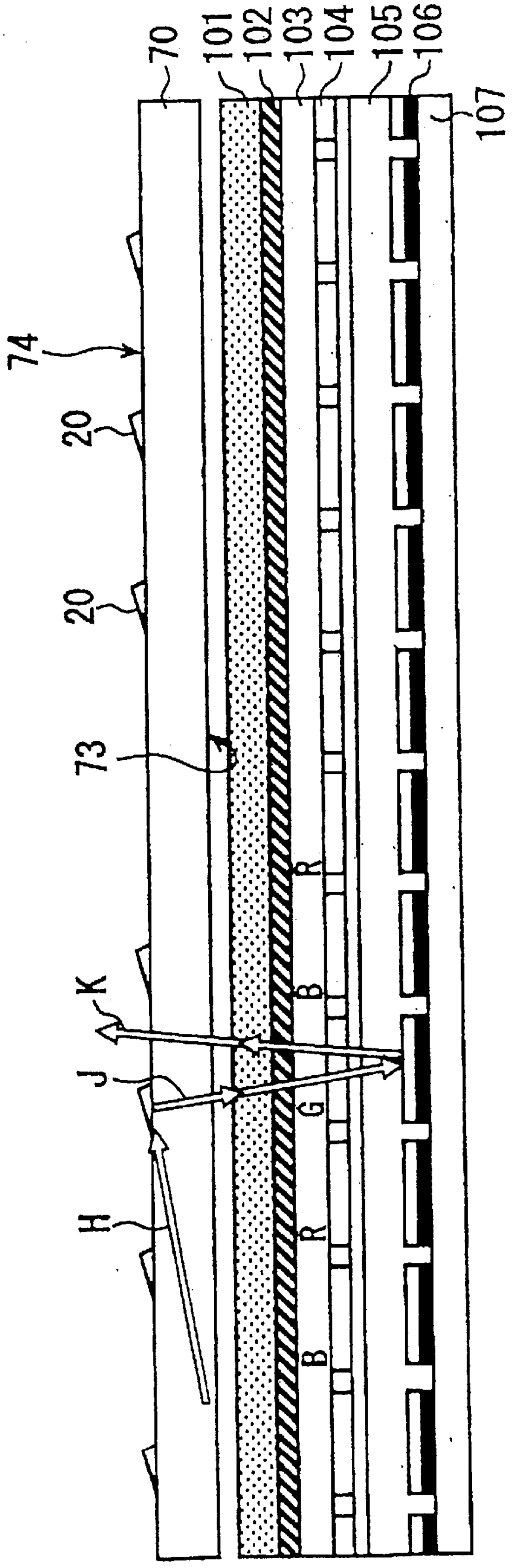
FIG. 12 is a cross section view illustrating a sixth embodiment wherein a surface light source device in accordance with the present invention is applied to a front lighting arrangement in a front-lighting-type liquid crystal display.

Although the fifth embodiment has an outline similar to that of the above-described embodiments, in particular, that of the forth embodiment, the fifth embodiment employs a different light guide plate and primary light sources. In the present embodiment, a light guide plate 60 and two primary light sources L6 and L7 as shown in FIG. 11 are adopted.

The light guide plate 60 is made of a transparent material such as acrylic resin, polycarbonate (PC) or cycloolefin-type resin, having a side end face 62 with recesses 62*a* and 62*b* to provide incidence end faces.

The primary light sources L6 and L7 are point-like light sources like ones employed in the forth embodiment, for instance, being arranged so that the light guide plate 60 is supplied with light through the recesses 62*a* and 62*b*, respectively. A great number of micro-reflectors 20 are formed on a back face 64. Arrangement and orientation of the micro-reflectors 20 involves the following features.

1. Covering rate and orientation of the micro-reflectors 20 are designed, in view of positions in relation to the recesses 62*a* and 62*b*, so that brightness variation does not appear on an emission face.

First, covering rate and orientation distribution (called Distribution 3) are designed so that brightness is uniform over an emission face under a provisional condition that only L6, one of the primary light sources, supplies light. Micro-reflectors according to this Distribution 3 provides a group (called group 3).

Next, covering rate and orientation distribution (called Distribution 4) are designed so that brightness is uniform over an emission face under another provisional condition that only the other primary light source L7 supplies light. Micro-reflectors according to this Distribution 4 provides a group (called group 4).

Distribution 3 and Distribution 4 are piled up to determine a covering rate and orientation distribution (i.e. Distribution 3 for group 3+Distribution 4 for group 4) to be employed in the present embodiment.

Covering rate according to Distribution 3 tends to increase as distance from the primary light source L6 increases while that according to Distribution 4 increases as distance from the primary light source L7 increases.

Consequently, gradient of Distribution 3 tends to cancel that of Distribution 4 as a whole. In the illustrated example, a resultant covering rate is approximately constant.

Micro-reflectors 20 of group 3 are arranged radially with respect to the recess 62*a* according to Distribution 3 while micro-reflectors 20 of group 4 are arranged radially with respect to the recess 62*b* according to Distribution 4. Bottom faces 21 of the former (group 3) are located as to be directed to the recess 62*a* while bottom faces 21 of the latter (group 4) are located as to be directed to the recess 62*b*.

As described above, such a grouping method like that used in the third embodiment may be applied to cases where a plurality of light supply positions exist and correspondingly a plurality of inputting directions exist. In this embodiment, two light supply positions are employed. However, if light supply is effected from three or more positions, an increased number of groups are prepared and covering distribution and orientation distribution can be designed for each group.

2. Micro-reflector arrangement does not have regularity such that many micro-reflectors 20 align along a straight line. This makes the micro-reflectors 20 more inconspicuous. And besides, if incorporated in a liquid crystal display, the micro-reflectors can avoid from bringing Moire fringes which would be caused by an overlapping relation with a matrix-like electrode arrangement.

(6) Sixth Embodiment

The present invention may be applied to front-lighting for a liquid crystal display of front-lighting-type, as shown in FIG. 11. This is described as the sixth embodiment.

A light guide plate 70 of a surface light source device used for front-lighting is arrange in the front of a liquid crystal display panel (i.e. on the viewing side). The liquid crystal display panel is composed of a scattering film (light diffusing sheet) 101, polarization plate 102, first glass substrate 103, color filter 104, liquid crystal cell 105, mirror surface reflection electrode 106, and a second glass substrate 107. The color filter 104 has three primary color regions R, G and B. Such structure and operation of the liquid crystal display panel are known well and detailed description is omitted.

The light guide plate 70 and a primary light source (not shown) may be arranged in a manner as adopted in any of the first through fifth embodiments.

The light guide plate 70 employed for front-lighting is disposed so that an emission face 73 just faces the liquid crystal display panel. As indicated with references H, J, K, when light H propagating in the light guide plate 70 is inputted into the a micro-reflector 20, double inner reflection as aforesaid follows to convert the inputted light into inner output J. Inner output J is emitted through the emission face 73 in a generally frontal direction, being incident to the liquid crystal display panel.

The mirror surface reflection electrode 106 reflects inner output light J reaching the electrode via the scattering film (light diffusing sheet) 101, polarization plate 102, first glass substrate 103, color filter 104 and liquid crystal cell 105. This reflected light comes to the polarization plate 102 again via the liquid crystal cell 105, color filter 104 and the first glass substrate 103. The polarization plate 102 effects transmitting or blocking for each pixel depending on ON/OFF-state of the corresponding mirror surface reflection electrode 106 (i.e. depending on polarization state).

If the mirror surface reflection electrode 106 allow the reflected light to transmits through the polarization plate 102, the light is emitted from a back face 74 as displaying light K after passing through the scattering film (light diffusion sheet) 101 and the light guide plate 70.

It is important that much of the light encountering any micro-reflector 20 on the back face 74 is also emitted from a flat bottom face 21 toward a generally frontal direction. This is illustrated in FIG. 13.

Figure 13:
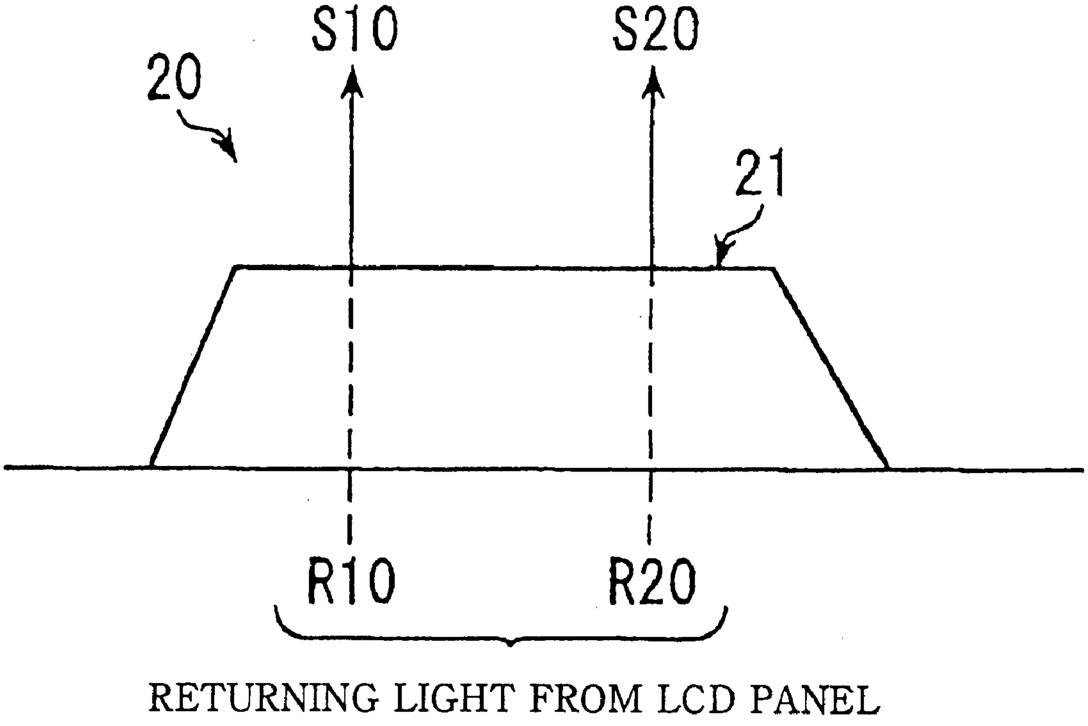
FIG. 13 illustrates a merit being obtained when the present invention is applied to a front-lighting arrangement.

Since a micro-reflector 20 is shaped like a tableland as shown in FIGS. 7*a* to 7*c* and this FIG. 13, returning light R10, R20 encountering a micro-reflector 20 after coming back into the light guide plate 70 from the liquid crystal display panel has inner-incident positions which are located on the bottom face 21 with a high possibility.

Since the bottom face extends generally in parallel with a general plane of the back face 74, the emission from it occurs equivalently as compared with that from a portion having no micro-reflector 20 in the back face 74.

Since light supply to the LCD panel is done usually from a generally frontal direction, the returning light R10, R20 is incident to the bottom face 21 at a generally vertical angle, being emitted toward a generally frontal direction to provide emission S10, S20.

Figure 3:
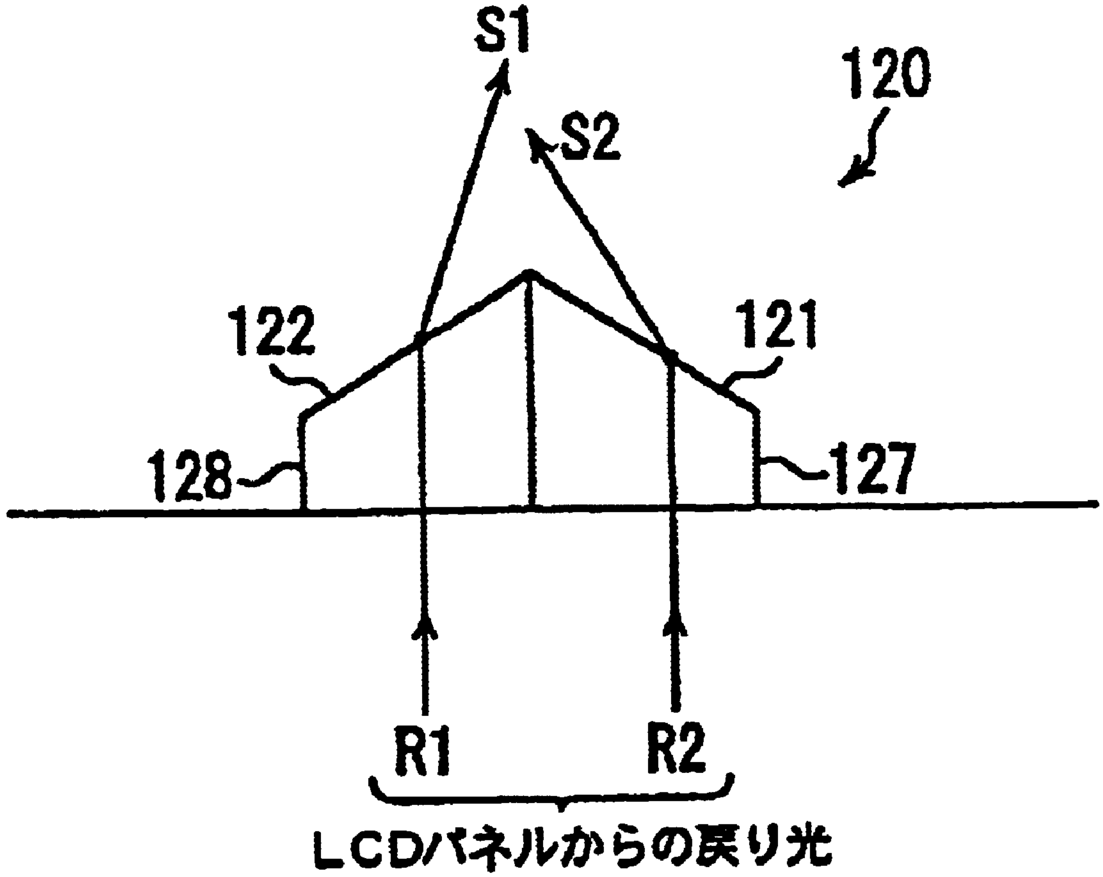
FIG. 3 illustrates a problem arising when the prior art shown in FIG. 2 is applied to a front-lighting arrangement.

This prevents reduced display contrast and sharpness of information to be displayed (i.e. blurring of an image to be displayed) from occurring (Compare with FIG. 3 and related description).

Figure 14:
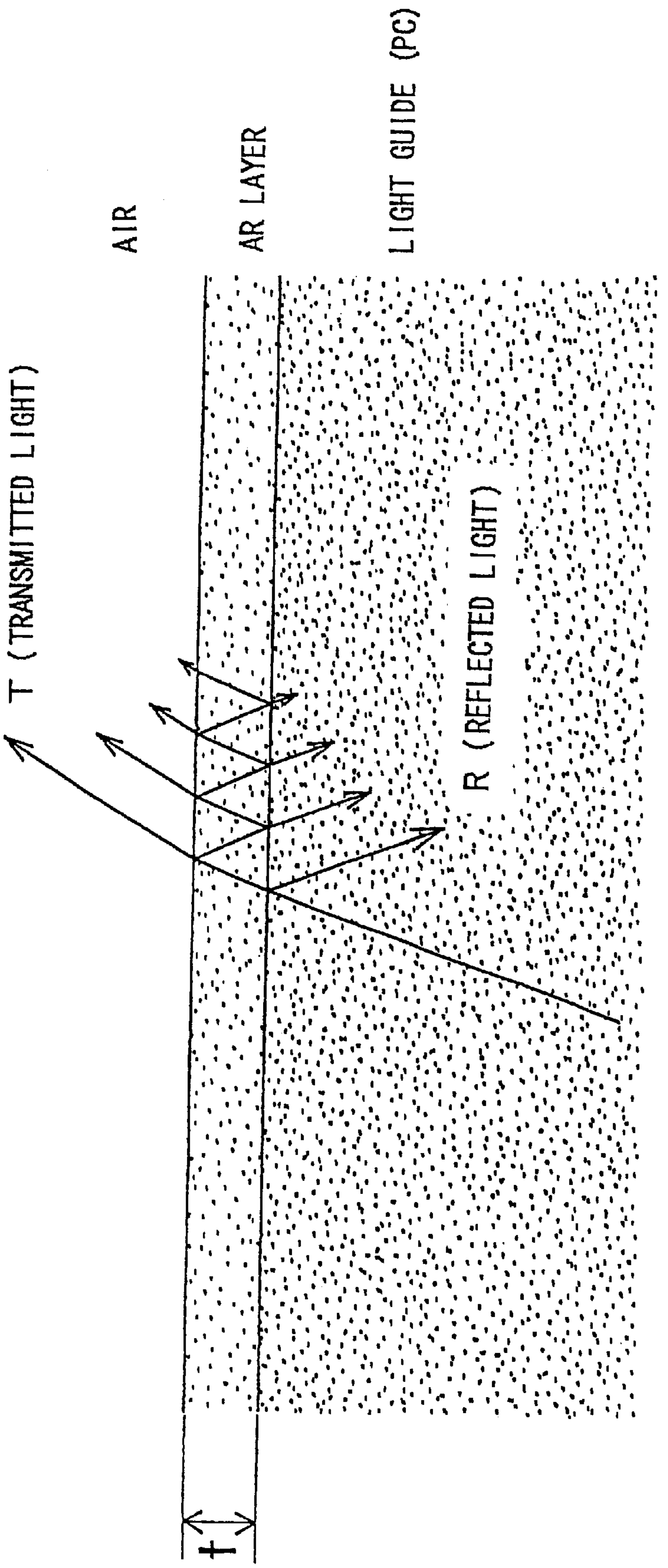
FIG. 14 illustrates an effect of an antireflection film.

It is preferable to apply an antireflection layer to the emission faces of the light guide plates employed in the above-described embodiments, in particular in the sixth embodiment. FIG. 14 is a cross section view to illustrate an example of an antireflection layer applied to an emission face of a light guide plate. The antireflection layer AR is, for example, made of MgF2 (refractive index=1.38), having a thickness of t=99.6 $\mu$m. The light guide plate is made of polycarbonate (PC;refractive index=1.58).

Some of the light inner-incident to the emission face is reflected at PC-MgF2 interface and MgF2-air interface, with some of the other being transmitted. As known well, if relation among factors such as thickness and refractive index of the anti reflection layer AR, and wavelength and incidence angle is such that transmitting light T is enforced by virtue of interference and reflection light R is weaken by virtue of interference, the antireflection layer AR demonstrates its antireflection function.

Figure 15:
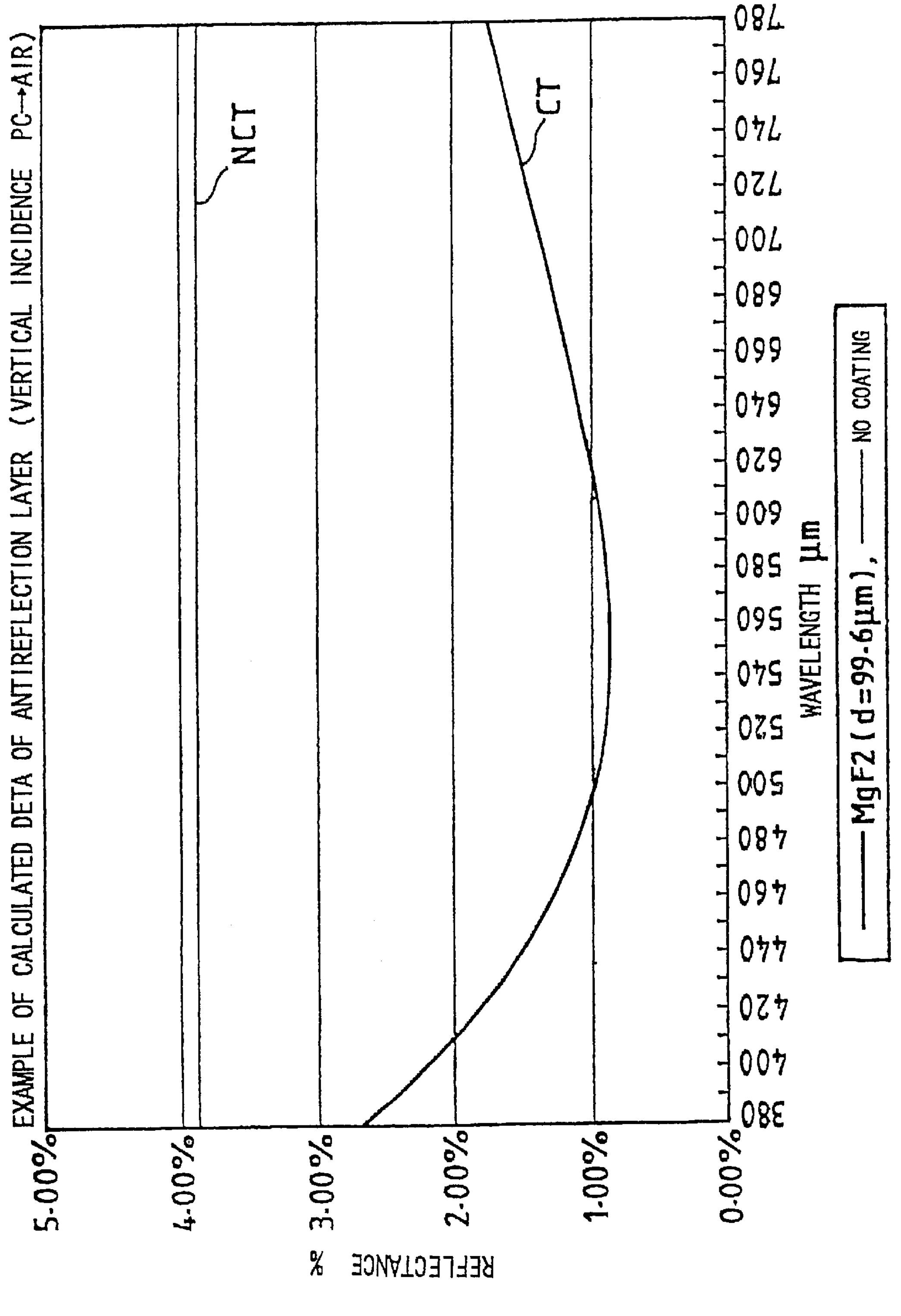
FIG. 15 is a graph illustrating exemplarily characteristics of an antireflection film.

FIG. 15 is a graph illustrating reflection coefficient (100%—emission coefficient) of vertical incidence light as a function of wavelength under the above conditions, with an illustration of a case where no antireflection layer is applied. As understood from the graph, reflection coefficient keeps approximately a constant value, 3.8% in the case of no antireflection layer (NCT). To the contrary, if the above antireflection layer is applied (CT), reflection coefficient falls into a low-value range from 1% to 2% for light within a wavelength region from 400 $\mu$m to 780 $\mu$m.

Accordingly, if such a antireflection layer is applied to the emission faces of the light guide plates employed in the embodiments, in particular in the sixth embodiments, the emission faces provide smooth emission with reduction of noise which is originated from reflection.

As described above, the present invention utilizes micro-reflectors distributed on a back face of a light guide plate, wherein the micro-reflectors realize an effective direction conversion by means of mainly double reflection. Inner output light obtained thereby can be adjusted through directions of a pair of slopes included in a valley adjacent to a flat face of a micro-reflector.

Therefore, an emission toward useless directions can be avoided, contrasted with direction conversion relying upon scattering or diffusing. And emission toward a frontal direction or a direction around the frontal direction is achieved without need of employing a prism sheet.

Further, if a front-lighting arrangement is employed for an object, such as LCD panel, to be illuminated, light paths of returning light coming back from the object are less disturbed. In particular, a front-lighting arrangement for a front-lighting-type LCD is provided without suffering from reduction in display contrast and sharpness.

What is claimed is:

1. A light guide plate comprising:

two major faces to provide an emission face and a back face; and a side end face for introducing light, wherein said back face is provided with a great number of micro-reflectors for light-direction-conversion, each of said micro-reflectors being a projection shaped like a tableland projecting from a general plane on which said back face generally extends, each of said micro-reflectors providing a flat bottom face and a valley adjacent to said bottom face, said bottom face extending approximately in parallel with said general plane on which said back face generally extends, said valley including first and second slopes and being formed as to tend to get narrower and shallower with an increasing distance from said bottom face, thereby causing an inner input light reaching said valley to be inner-reflected by one of said first and second slopes and then inner-reflected by the other, and causing an inner output light directed to said emission face to be produced.

2. A light guide plate as defined in claim 1, wherein an extending direction of said valley varies depending on position on said back face.

3. A surface light source device comprising:

at least one primary light source; and a light guide plate having two major faces to provide an emission face and a back face and a side end face for introducing light from said primary light source, wherein said back face is provided with a great number of micro-reflectors for light-direction-conversion, each of said micro-reflectors being a projection shaped like a tableland projecting from a general plane on which said back face generally extends, each of said micro-reflectors providing a flat bottom face and a valley adjacent to said bottom face, said bottom face extending approximately in parallel with said general plane on which said back face generally extends, said valley including first and second slopes and being formed as to tend to get narrower and shallower with an increasing distance from said bottom face, thereby causing an inner input light reaching said valley to be inner-reflected by one of said first and second slopes and then inner-reflected by the other, and causing an inner output light directed to said emission face to be produced.

4. A surface light source device as defined in claim 3, wherein an extending direction of said valley varies depending on position on said back face.

5. A surface light source device as defined in claim 3 or 4, wherein said light introducing is done from a plurality of directions different from one another and said great number of micro-reflectors are classified regarding orientation into groups corresponding to said plurality of directions respectively so that micro-reflectors belonging to each of said groups has charge of a partial production of said inner output light according to a share allotted to each of said groups.

6. A surface light source device as defined in claim 5, wherein each of said plurality of groups consist of micro-reflectors which are approximately equal in shape, size in number regardless of belonging to which of said groups.

7. A liquid crystal display comprising:

a surface light source device; and a liquid crystal display panel illuminated by said surface light source device which comprises at least one primary light source and a light guide plate having two major faces to provide an emission face and a back face and a side end face for introducing light from said primary light source, wherein said back face is provided with a great number of micro-reflectors for light-direction-conversion, each of said micro-reflectors being a projection shaped like a tableland projecting from a general plane on which said back face generally extends, each of said micro-reflectors providing a flat bottom face and a valley adjacent to said bottom face, said bottom face extending approximately in parallel with said general plane on which said back face generally extends, said valley including first and second slopes and being formed as to tend to get narrower and shallower with an increasing distance from said bottom face, thereby causing an inner input light reaching said valley to be inner-reflected by one of said first and second slopes and then inner-reflected by the other, and causing an inner output light directed to said emission face to be produced.

8. A liquid crystal display comprising:

a liquid crystal display panel; and a surface light source device for illuminating said liquid crystal display panel from a front side, said surface light source device comprising at least one primary light source and a light guide plate having two major faces to provide an emission face and a back face and a side end face for introducing light from said primary light source, wherein said back face is provided with a great number of micro-reflectors for light-direction-conversion, each of said micro-reflectors being a projection shaped like a tableland projecting from a general plane on which said back face generally extends, each of said micro-reflectors providing a flat bottom face and a valley adjacent to said bottom face, said bottom face extending approximately in parallel with said general plane on which said back face generally extends, said valley including first and second slopes and being formed as to tend to get narrower and shallower with an increasing distance from said bottom face, thereby causing an inner input light reaching said valley to be inner-reflected by one of said first and second slopes and then inner-reflected by the other, and causing an inner output light directed to said emission face to be produced.

9. A liquid crystal display as defined in claim 7 or 8, wherein an extending direction of said valley varies depending on position on said back face.

10. A liquid crystal display as defined in claim 7 or 8, wherein said light introducing is done from a plurality of directions different from one another and said great number of micro-reflectors are classified regarding orientation into groups corresponding to said plurality of directions respectively so that micro-reflectors belonging to each of said groups has charge of a partial production of said inner output light according to a share allotted to each of said groups.

11. A liquid crystal display as defined in claim 10, wherein each of said plurality of groups consist of micro-reflectors which are approximately equal in shape, size in number regardless of belonging to which of said groups.

* * * * *

UNITED STATES PATENT AND TRADEMARK OFFICE
CERTIFICATE OF CORRECTION

PATENT NO. : 6,678,021 B2
DATED : January 13, 2004
INVENTOR(S) : Shingo Ohkawa

It is certified that error appears in the above-identified patent and that said Letters Patent is hereby corrected as shown below:

Column 6,
Line 11, after "three" insert -- directions, Fig. 7a being a view from +× direction, Fig. 7b being a --.

Signed and Sealed this

Eleventh Day of May, 2004

JON W. DUDAS
*Acting Director of the United States Patent and Trademark Office*